United States Patent [19]

Witman et al.

[11] Patent Number: 4,563,503

[45] Date of Patent: Jan. 7, 1986

[54] POLYCARBONATE COMPOSITIONS HAVING IMPROVED IMPACT PERFORMANCE

[75] Inventors: Mark W. Witman, New Martinsville, W. Va.; Gerard E. Reinert, McMurray, Pa.

[73] Assignee: Mobay Chemical Corporation, Pittsburgh, Pa.

[21] Appl. No.: 433,583

[22] Filed: Oct. 12, 1982

[51] Int. Cl.$^4$ .............................................. C08L 69/00
[52] U.S. Cl. .................... 525/148; 525/147; 524/508
[58] Field of Search ................................ 525/148, 178

[56] References Cited

U.S. PATENT DOCUMENTS

| 3,437,631 | 4/1969 | Cleveland | 260/37 |
| 3,461,187 | 8/1969 | Cantrill | 260/873 |
| 3,480,695 | 11/1969 | Hale | 525/462 |
| 3,742,088 | 6/1973 | Holder et al. | 260/873 |
| 3,763,088 | 10/1973 | Izawa | 525/463 |
| 4,043,980 | 8/1977 | Baron et al. | 260/47 XA |
| 4,172,859 | 10/1979 | Epstein | 428/402 |
| 4,299,928 | 11/1981 | Witman | 525/67 |

Primary Examiner—John C. Bleutge
Assistant Examiner—Patricia Short
Attorney, Agent, or Firm—Gene Harsh; Lawrence S. Pope; Aron Preis

[57] ABSTRACT

A thermoplastic compositions comprising an aromatic polycarbonate resin and a copolymer of $C_1$–$C_{18}$ alkyl acrylate with a hydroxy $C_1$–$C_{18}$ alkylacrylate is characterized by its improved notched Izod impact strength and critical thickness.

4 Claims, No Drawings

POLYCARBONATE COMPOSITIONS HAVING IMPROVED IMPACT PERFORMANCE

FIELD OF THE INVENTION

The present invention relates to polycarbonate compositions and in particular, to polycarbonate blends having improved impact performance.

DESCRIPTION OF THE PRIOR ART

Polycarbonates derived from reactions involving organic dihydroxy compounds and carbonic acid derivatives have found extensive commercial applications because of their excellent mechanical and physical properties. These thermoplastic polymers are particularly suited for molding articles for which impact strength, rigidity, toughness, thermal and dimensional stability, as well as excellent electrical properties are required.

It is known that polycarbonates exhibit high notched Izod (ASTM test D-256) impact values. These values, about 16 ft-lbs/in., associated with failure in a ductile mode, are characteristic of test specimens thinner than about one-eighth inch. Thicker specimens, i.e., one-fourth inch, fail in a brittle fashion at about 2.5 ft-lbs/in.

Impact strength dependence on thickness gives rise to "critical thickness", a material parameter defined as that thickness at which a discontinuity occurs in the graphical representation of impact strength vs. specimen thickness. For example, polycarbonate based on bisphenol A, having a melt flow rate of 3 to 6 grams/10 minutes at 300° C. (ASTM D 1238) exhibits a discontinuity at about 5.71 mm (225 mils). Articles of this material thinner than 225 mils will show ductile failure upon impact while thicker ones will fail in a brittle fashion.

This dependence of impact performance on thickness represents a drawback because it tends to limit the utility of polycarbonates by imposing restrictions on the design of molded articles.

One approach to solving the critical thickness problem has been by incorporation of polyolefin into the polycarbonate resin (see U.S. Pat. No. 3,437,631). Another approach, taught by U.S. Pat. No. 4,043,980, entails the introduction of sulfur containing aromatic diols into the polycarbonate chain. The art is noted to include 1 U.S. Pat. No. 3,461,187 which is considered to disclose a thermoplastic graft copolymer of (a) a polymer backbone containing functional groups pendant thereon and (b) an aromatic polycarbonate group. Among the possible pendant functional groups a hydroxyl group is indicated and a polyacrylate is indicated among the possible backbones.

Polyacrylate rubbers as impact modifiers for polycarbonate resins are disclosed in U.S. Pat. No. 3,742,088. Among the suitable modifiers there are noted copolymers of lower alkyl acrylates with stearyl acrylates.

Further noted in their relevance to the present technology are U.S. Pat. No. 4,299,928 wherein taught are impact modified polycarbonate compositions containing an acrylic rubber interpolymer composite, and U.S. Pat. No. 4,172,859 wherein disclosed are toughened thermoplastic compositions, including polycarbonates, comprising modifiers which may be compolymers of, among others, alkyl acrylate.

BRIEF DESCRIPTION OF THE INVENTION

A thermoplastic composition comprising an aromatic polycarbonate resin and a copolymer of $C_1$–$C_{18}$ alkyl acrylate with a hydroxy $C_1$–$C_{18}$ alkylacrylate is characterized by its improved notched Izod impact strength and critical thickness.

DETAILED DESCRIPTION OF THE INVENTION

When used herein, the term "polycarbonate resins" means the neat resin without additives; "polycarbonate" means the polycarbonate resin with additives incorporated therein. The polycarbonate resins of the invention may be prepared by conventional methods of preparation for polycarbonate resins and may have a weight average molecular weight of 10,000 to 200,000 preferably 20,000 to 80,000 and preferably a melt flow rate of 1 to 24, preferably 2–12 grams/10 minutes at 300° C. (ASTM D-1238).

Any suitable processes, reactants, catalysts, solvent conditions and the like for the production of polycarbonate resins of this invention which are customarily employed in polycarbonate resin syntheses may be used, such as disclosed in German Pat. Nos. 1,046,311 and 962,274 and U.S. Pat. Nos. 3,248,414; 3,153,008; 3,215,668; 3,187,065; 3,028,365; 2,999,846; 2,964,974; 2,970,137; 1,991,273 and 2,999,835, all incorporated herein by reference.

Essentially the processes for the preparation of polycarbonate resins entails a reaction between a bisphenol with a carbonate precursor.

In the present context, bisphenols suitable for the preparation of the copolycarbonates of the invention conform to the structural formulae (1) or (2)

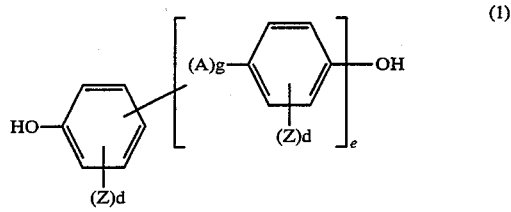

(1)

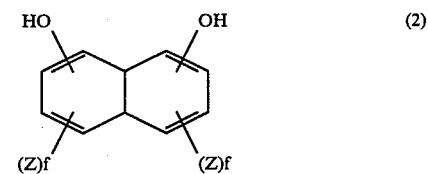

(2)

wherein

A denotes an alkylene group with 1 to 8 carbon atoms, an alkylidene group with 2 to 8 carbon atoms, a cycloalkylene group with 5 to 15 carbon atoms, a carbonyl group, an oxygen atom, an —SO— or —SO$_2$— radical; a radaical of the general formula:

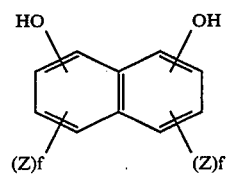

g denotes the number 0 or 1; e denotes the number 0 or 1; Z denotes F, Cl, Br or $C_1$–$C_4$-alkyl and if several Z radicals are substituents in one aryl radical, they may be identical or different; d denotes 0 or an integer from 1 to 3.

Among the useful bisphenols in the practice of the inventin are hydroquinone, resorcinol,
bis-(hydroxyphenyl)-alkanes,
bis-(hydroxyphenyl)-cycloalkanes,
bis-(hydroxyphenyl)-ethers,
bis-(hydroxyphenyl)-ketones,
bis-(hydroxyphenyl)-sulfoxides,
bis-(hydroxyphenyl)-sulfones and,
α,α-bis-(hydroxyphenyl)-diisopropylbenzenes,
as well as their nuclear-alkylated compounds. These and further suitable aromatic dihydroxy compounds are described, for example, in U.S. Pat. Nos. 3,028,365; 2,999,835; 3,148,172; 3,271,368; 2,991,273; 3,271,367; 3,280,078; 3,014,891 and 2,999,846 (all incorporated herein by reference), in German Offenlegungsschriften (German Published Specifications) Nos. 1,570,703; 2,063,050; 2,063,052; 2,211,956 and 2,211,957, in French Patent Specificatin No. 1,561,518 and in the monograph, H. Schnell, *Chemistry and Physics of Polycarbonates*, Interscience Publishers, New York, 1964. Further examples of suitable bisphenols are
2,2-bis-(4-hydroxyphenyl)-propane (bisphenol A),
2,4-bis-(4-hydroxyphenyl)-2-methylbutane,
1,1-bis-(4-hydroxyphenyl)-cyclohexane,
α,α-bis-(4-hydroxyphenyl)-p-diisopropylbenzene,
2,2-bis-(3-methyl-4-hydroxyphenyl)-propane,
2,2-bis-(3-chloro-4-hydroxyphenyl)-propane,
bis-(3,5-dimethyl-4-hydroxyphenyl)-methane,
2,2-bis-(3,5-dimethyl-4hydroxyphenyl)-propane,
bis-(3,5-dimethyl-4-hydroxyphenyl)-sulfoxide,
bis-(3,5-dimethyl-4-hydroxyphenyl)-sulfone,
hydroxybenzophenone,
2,4-bis-(3,5-dimethyl-4-hydroxyphenyl)-2-methylbutane,
1,1-bis-(3,5-dimethyl-4-hydroxyphenyl)-cyclohexane,
α,α-bis-(3,5-dimethyl-4-hydroxyphenyl)-p-diiso-propyl-benzene,
4,4'-sulfonyl diphenol.

Examples of particularly preferred aromatic bisphenols are 2,2-bis-(4-hydroxyphenyl)-propane, 2,2bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The copolycarbonates of the invention may entail in their structure units derived from one or more of the suitable bisphenols.

The aromatic polycarbonate resins of the invention can be branched by incorporating small amounts, i.e. between 0.05 and 2.0 mol percent (relative to the amount of diphenols) of compounds which are trifunctional or more than trifunctional, in particular those with three or more phenolic hydroxyl groups.

Polycarbonates of this type are described, for example, in DOS (German published specifications) Nos. 1,570,533; 1,595,762; 2,116,974; 2,113,347 and 2,500,092, in British Patent Specification No. 1,079,821 and in U.S. Pat. No. 3,511,514.

Examples of some of the compounds which have three or more phenolic hydroxyl groups and which can be used are phloroglucinol, 4,4-dimethyl-2,4,6-tri-(4-hydroxyphenyl)-hept-2-ane, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)phenylmethane, 2,2-bis-[4,4-bis-(4-hydroxyphenyl)-cyclohexyl]propane, 2,4-bis(4-hydroxyphenylisopropyl)-phenyl-2,6-bis-(2-hydroxy-5'-methyl-benzyl)-4-methylphenol, 2-(4-hydroxyphenyl)-2-(2,4-dihydroxyphenyl)-propane and 1,4-bis-(4,4''-dihydroxy-triphenylmethyl)-benzene. Other suitable trifunctional compounds are 2,4-dihydroxybenzoic acid, trimesic acid, cyanuric chloride, 3,3-bis-(4-hydroxyphenyl)-2-oxo-2,3-dihydroindole and 3,3-bis-(3-methyl-4-hydroxyphenyl)-2-oxo-2,3-dihydroindole.3,3-bis-(3-methyl-4-hydroxyphenyl)-2-oxo-2,3-dihydroindole.

Further suitable in the context of the invention are phenolphthalein-based polycarbonate resins, including copolycarbonates and terpolycarbonates such as are described in U.S. Pat. Nos. 3,036,036 and 4,210,741 both incorporated herein by reference.

The modifier suitable in the present context is a copolymer of a $C_1$–$C_{18}$ acrylate and a hydroxy $C_1$–$C_{18}$ alkylacrylate conforming structurally to

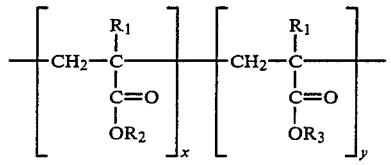

wherein
$R_1$ denotes a $C_1$ to $C_{18}$ alkyl or a hydrogen atom
$R_2$ denotes a $C_1$ to $C_{18}$ alkyl, preferably a butyl radical
$R_3$ denotes a $C_1$ to $C_{18}$ alkyl with the proviso that it contains at least one OH group, said copolymer further characterized in that its molecular weight is about 50,000 to 3,000,000, preferably 80,000 to 200,000 and further in that its pendant OH functionality is between about 0.1 and about 5.0 preferably between about 0.2 and about 2.5 percent by weight and in that its glass transition temperature is lower than about 40° C. The copolymer is essentially linear but may optionally be cross-linked. A preferred copolyacrylate modifier in accordance with the invention is available under the tradename HYCAR 4004 from the B. F. Goodrich Company. Listed below are properties characteristic of HYCAR 4004

| Mooney Viscosity (ML-4-100° C.) | 30 |
| --- | --- |
| % Gel (0.4 in MEK) | 69 |
| Swell Index (0.4 in MEK) | 38.6 |
| Dilute Solution Viscosity (0.4 in MEK) | 1.29 |
| % Heat Loss | 0.34 |
| % Ash | 0.38 |
| $T_g$ (°C.) | −41.0 |
| Refractive Index (at 20° C.) | 1.466 |

Compositions in accordance with the present invention comprise polycarbonate resin and a modifying amount, preferably between about 1.5 and about 8%, more preferably about 2.0 to about 5 percent of the modifying copolymer of the invention said percents being related to the total weight of the polycarbonate resin and the weight of the modifying copolymer. The compositions may further comprise any of release agents, plasticizers, pigments, fillers and reinforcing agents, as well as any of the known thermal and hydrolytic stabilizers, for polycarbonate resins as are well known in the art.

The invention will be illustrated but is not intended to be restricted by the following examples.

EXAMPLE 1

Compositions in accordance with the present invention comprising polycarbonate and additive amounts of the modifier were prepared and their properties determined as indicated below. The evaluation set the properties of these compositions in comparison to similarly made compositions wherein modifier-featuring chlorine atom pendancy was HYCAR 4054, from B. F. Goodrich (see table 1). The compositions were prepared by first tumble blending the components followed by extrusion on a 1½" W&H single screen extruder. The extrusion was carried out at a temperature profile of 550°, 550°, 520°, 520° F. with a screen pack: 20, 40, 60, 20. The polycarbonate resin used in this series of experiments consisted of a blend of Merlon M-50 and Merlon M-39—at a ratio of 1.5/3.5 (M-50/M-39)—both of which are resins available commercially from Mobay Chemical Corporation and are characterized in, among others, their melt flow rates (per ASTM D-1238) being 3.0–5.9 gm/10 min and 12–29 gm/10 min. respectively.

TABLE 1

| Modifier, type[1] | 1 | 1 | 2 | 2 |
|---|---|---|---|---|
| amount, phr | 2.5 | 5.0 | 2.5 | 5.0 |
| Critical thickness, mils | >255 | >257 | 123 | 205 |
| Impact strength, Notched Izod, ft. lb/in | | | | |
| ⅛" | 16.0 | 14.3 | 7.4 | 11.6 |
| ¼" | 12.3 | 8.1 | 2.5 | 4.8 |

[1]Modifier 1: Hycar 4004,
Modifier 2: Hycar 4054

Hycar 4004 is further characterized in that its OH functionality is 0.29 wt. % and in that its viscosity average mole when weight is solvent is 100,000.

EXAMPLE 2

Compositions in accordance with the present invention were prepared and their properties evaluated. The table below (Tables 2, 3 and 4) summarize the results of the evaluations and set these in comparison to other compositions similarly prepared differing however in the structure of their respective polyacrylates. The compositions all were based on Merlon M-40a polycarbonate resin having a melt flow of about 6.0–11.9 gm/10 min at 300° C.–1200 gm load per ASTM D-1238, available from Mobay Chemical Corporation—and were dry blended prior to extrusion (1½", Waldron Hartig, screw 2.75:1, screen pack 20, 40, 60, 20; 50 rpm; temperature profile 580°, 580°, 550°, 550° F.,). Test specimens were injection molded—using a 3 oz., 35 sec. cycle, 550°, 550°, 520° F. molding temperature.

The polybutyl acrylate and the polyethyl acrylate were substantially similar to modifiers of the present invention represented by HYCAR 4004—except for the absence of a pendent OH from their respective structures.

TABLE 2

| | Impact strength Notched Izod | | |
|---|---|---|---|
| | ⅛" (Ft. lbs/in.) | ¼" (Ft. lbs/in) | critical thickness Mils |
| Polybutylacrylate | | | |
| 2.0% | 15.5 | 7.0 | 235 |
| 3.0% | 14.7 | 12.9 | >259 |
| 4.0% | 14.3 | 12.9 | >255 |
| Polyethylacrylate | | | |
| 2.0% | 16.1 | 3.6 | 215 |
| 3.0% | 18.1 | 4.5 | >255 |
| 4.0% | 16.0 | 12.9 | >258 |
| Hycar 4004 | | | |
| 2.0% | 15.9 | 9.1 | >255 |
| 3.0% | 16.4 | 13.5 | >257 |
| 4.0% | 14.6 | 13.8 | >255 |

In addition to the clear advantages indicated in terms of improved impact performance, the copolymers of the invention show a remarkable thermal stability and are practically uneffected at the high process temperature of polycarbonates, a performance unexpected in view of the pendent alkyl OH in their structure.

The rheology of the compositions of the invention was determined and is presented below and set in comparison to similar blends wherein polyacrylate is structurally different from the polyacrylate of the invention. The data demonstrates the suitability of the blends of the invention for commercial thermoplastic processing.

TABLE 3

| | Melt Viscosity (Pa · S) | | |
|---|---|---|---|
| Shear Rate, S⁻¹ | 4.0% Polybutyl Acrylate | 4.0% Polyethyl-acrylate | 4.0% Hycar 4004 |
| 5.7 | 824 | 560 | 1932 |
| 14.2 | 731 | 435 | 1183 |
| 28.4 | 612 | 693 | 633 |
| 56.7 | 544 | 544 | 781 |
| 141.8 | 458 | 458 | 458 |
| 283.5 | 335 | 330 | 436 |
| 567 | 290 | 301 | 348 |
| 1418 | 201 | 205 | 245 |

The melt stability (at 300° C.) of the above resinous blends is presented below in Table 4.

TABLE 4

| Time | 4.0% Polybutyl Acrylate | 4.0% Polyethyl-acrylate | 4.0% Hycar 4004 |
|---|---|---|---|
| 5 min. | 544 | 554 | 781 |
| 35 min. | 486 | 496 | 623 |
| 65 min. | 396 | 354 | 544 |
| Stability | −2.50 Pa · S/min. | −3.33 Pa · S/min. | −3.90 Pa · S/min. |

Although the invention has been described with reference to specific materials, the invention is only to be limited so far as is set for the in the accompanying claims.

What is claimed is:

1. An injection molding composition comprising
   (i) polycarbonate resin and
   (ii) about 2 to about 5 percent relative to the total weight of said (i) plus said (ii) of a copoly($C_1$–$C_{18}$ alkyl-acrylate) conforming structurally to

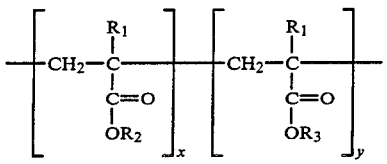

wherein
- $R_1$ denotes a $C_1$ to $C_{18}$ alkyl or a hydrogen atom,
- $R_2$ denotes a $C_1$ to $C_{18}$ alkyl,
- $R_3$ denotes a $C_1$ to $C_{18}$ alkyl with the proviso that it contains at least one OH group, and
- x and y are selected to render the molecular weight of said copoly($C_1$–$C_{18}$ alkylacrylate) between 50,000 and 3,000,000 and an OH functionality of between 0.1 and 5.0 percent by weight.

2. The composition of claim 1 wherein said $R_2$ is a butyl radical.

3. The composition of claim 1 wherein said copoly($C_1$–$C_{18}$ alkylacrylate) is characterized in that its glass transition temperature is lower than about 40° C.

4. An injection molding composition comprising
   (i) polycarbonate resin and
   (ii) about 1.5 to about 4 percent relative to the total weight of said (i) plus said (ii) of a copoly($C_1$–$C_{18}$ alkylacrylate) conforming structurally to

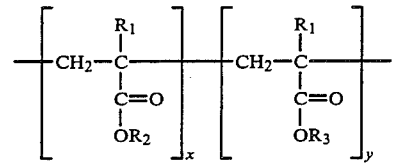

wherein
- $R_1$ denotes a $C_1$ to $C_{18}$ alkyl or a hydrogen atom,
- $R_2$ denotes a $C_1$ to $C_{18}$ alkyl,
- $R_3$ denotes a $C_1$ to $C_{18}$ alkyl with the proviso that it contains at least one OH group, and
- x and y are selected to render the molecular weight of said copoly($C_1$–$C_{18}$ alkylacrylate) between 50,000 and 3,000,000 and an OH functionality of between 0.1 and 5.0 percent by weight.

* * * * *